(12) United States Patent
Weerawansa et al.

(10) Patent No.: US 12,145,351 B2
(45) Date of Patent: Nov. 19, 2024

(54) STRETCHABLE TEXTILE ARTICLE

(71) Applicant: Stretchline Intellectual Properties Limited, Long Eaton (GB)

(72) Inventors: L. A. D. Krishan Chaminda Weerawansa, Columbo (LK); A. Nalantha Priyaranga De Alwis, Panadura (LK)

(73) Assignee: Stretchline Intellectual Properties Limited, Nottingham (GB)

( * ) Notice: Subject to any disclaimer, the term of this patent is extended or adjusted under 35 U.S.C. 154(b) by 139 days.

(21) Appl. No.: 17/784,409

(22) PCT Filed: Dec. 11, 2020

(86) PCT No.: PCT/GB2020/053193
§ 371 (c)(1),
(2) Date: Jun. 10, 2022

(87) PCT Pub. No.: WO2021/116708
PCT Pub. Date: Jun. 17, 2021

(65) Prior Publication Data
US 2023/0014021 A1 Jan. 19, 2023

(30) Foreign Application Priority Data

Dec. 12, 2019 (GB) ..................................... 1918270

(51) Int. Cl.
*B32B 7/14* (2006.01)
*B32B 3/08* (2006.01)
(Continued)

(52) U.S. Cl.
CPC ................ *B32B 7/14* (2013.01); *B32B 3/085* (2013.01); *B32B 5/024* (2013.01); *B32B 5/04* (2013.01);
(Continued)

(58) Field of Classification Search
CPC ........ A41B 9/16; A41D 31/18; A41D 31/185; A41F 15/00; A45F 3/14; A45F 2003/142;
(Continued)

(56) References Cited

U.S. PATENT DOCUMENTS 4,853,275 A * 8/1989 Tracy ....................... D04D 9/04
428/178
5,695,102 A 12/1997 Jackson
(Continued)

FOREIGN PATENT DOCUMENTS

| EP | 2 702 884 A1 | 3/2014 |
|---|---|---|
| WO | WO-88/03186 A1 | 5/1988 |
| WO | WO-2020/055845 | 3/2020 |

OTHER PUBLICATIONS

International Search Report and Written Opinion issued in PCT/GB2020/053193 dated Mar. 19, 2021.
(Continued)

*Primary Examiner* — Laura C Powers
*Assistant Examiner* — Rebecca L Grusby
(74) *Attorney, Agent, or Firm* — Foley & Lardner LLP

(57) ABSTRACT

A stretchable textile article (20) comprises a plurality of discrete textile members (22,24), each textile member (22, 24) extending between a first end (26) and a second end (28), the first ends (26) of the textile members (22,24) being joined together, the second ends (28) of the textile members (22,24) being joined together, wherein the plurality of textile members (22,24) includes at least one first textile member (22) and at least one second textile member (24), the or each first textile member (22) including a textile zone configured to have an increasing stretch property away from the first end (26) towards the second end (28), the or each second textile member (24) including a textile zone configured to have an increasing stretch property away from the second end (28) towards the first end (26), wherein the stretchable
(Continued)

textile article (20) further includes a compressible textile member (100) arranged to interconnect the first and second textile members (22,24) so that, in use, stretch of the stretchable textile article (20) in an orientation extending between the joined first ends (26) and the joined second ends (28) causes compression of the compressible textile member (100).

13 Claims, 11 Drawing Sheets

(51) Int. Cl.
 *B32B 5/02* (2006.01)
 *B32B 5/04* (2006.01)
 *B32B 5/14* (2006.01)
(52) U.S. Cl.
 CPC ............ *B32B 5/14* (2013.01); *B32B 2307/51* (2013.01); *D10B 2401/061* (2013.01)
(58) Field of Classification Search
 CPC ........ A45F 3/12; A45F 2003/148; B32B 5/04; B32B 5/14; B32B 5/142; B32B 2307/51; D10B 2401/061
 See application file for complete search history.

(56) References Cited

U.S. PATENT DOCUMENTS

| | | | |
|---|---|---|---|
| 8,371,899 | B1 | 2/2013 | Walterscheid |
| 10,390,578 | B2 | 8/2019 | Kuo et al. |
| 2011/0041233 | A1 | 2/2011 | Nishikawa |
| 2013/0022794 | A1* | 1/2013 | Ng ..................... A61F 13/4902 428/195.1 |
| 2014/0110015 | A1* | 4/2014 | He .......................... D03D 3/00 139/11 |
| 2017/0099900 | A1* | 4/2017 | Toronjo ............... A43B 23/027 |
| 2020/0079048 | A1* | 3/2020 | Dow ........................ B32B 3/18 |

OTHER PUBLICATIONS

Search Report on United Kingdom application GB1918270.8 dated Jun. 4, 2020.
Examination Report and Notification of Intention to Grant for GB1918270.8 dated Jun. 30, 2023.

* cited by examiner

STRETCHABLE TEXTILE ARTICLE

STRETCHABLE TEXTILE ARTICLE

This invention relates to a stretchable textile article, preferably for use in a garment or a technical textile.

It is known to use stretchable textile articles to provide textile-based products, such as garments and technical textiles, with stretch properties.

According to an aspect of the invention, there is provided a stretchable textile article comprising a plurality of discrete textile members, each textile member extending between a first end and a second end, the first ends of the textile members being joined together, the second ends of the textile members being joined together, wherein the plurality of textile members includes at least one first textile member and at least one second textile member, the or each first textile member including a textile zone configured to have an increasing stretch property away from the first end towards the second end, the or each second textile member including a textile zone configured to have an increasing stretch property away from the second end towards the first end, wherein the stretchable textile article further includes a compressible textile member arranged to interconnect the first and second textile members so that, in use, stretch of the stretchable textile article in an orientation extending between the joined first ends and the joined second ends causes compression of the compressible textile member.

The term "textile" with reference to the invention is intended to cover, but is not limited to, the terms "cloth" and "fabric". In addition, the invention is applicable, but is not limited to, woven and non-woven textiles.

The term "discrete" with reference to the discrete textile members of the stretchable textile article of the invention is intended to mean that the textile members are individually separate and distinct textile members.

There are several ways of joining the ends of the discrete textile members. Such ways may include, but are not limited to, stitching, using adhesive, using permanent or temporary fasteners, connecting the ends via additional textile sections, and so on.

The combination of the plurality of discrete textile members joined at the first and second ends and the inclusion of a textile zone having an increasing stretch property in each of the first and second textile members results in a multi-modulus stretchable textile article with stretch properties which is not available to, or readily producible in, a single textile member. More specifically, by configuring the stretch properties of the textile zones of the first and second textile members to increase in opposite directions between the first and second ends, application of a load, force or stress to cause overall stretching of the stretchable textile article causes relative stretch between the first and second textile members in opposite directions as a result of the different stretch properties of the first and second textile members. The relative stretch between the first and second textile members in opposite directions in turn causes compression of the compressible textile member that interconnects the first and second textile members. Such configuration of the first, second and compressible textile members therefore enables the compression of the compressible textile member through stretching of the stretchable textile fabric of the invention.

In addition, by employing the use of discrete textile members, the stretch properties of the stretchable textile article of the invention can be easily customised to match the requirements of a wide range of textile products and applications. Such customisation may include choosing a suitable increasing stretch property, shape and size of each discrete textile member.

The textile zone of each textile member may extend partially or entirely across a length of the corresponding textile member between the first and second ends.

In a preferred embodiment of the invention, the compressible textile member is configured so that, in use, the stretch of the stretchable textile article in the orientation extending between the joined first ends and the joined second ends to compress the compressible textile member causes expansion of the compressible textile member in an orientation that is perpendicular, or substantially perpendicular, to the orientation extending between the joined first ends and the joined second ends.

By configuring the compressible textile member in this manner, the stretchable textile article is additionally provided with the property of auxeticity, which increases the range of textile products and applications to which the stretchable textile article can be applied.

In embodiments of the invention, the stretch property of the textile zone of the or each first textile member may be continuously or discontinuously increasing away from the first end towards the second end, and the stretch property of the textile zone of the or each second textile member may be continuously or discontinuously increasing away from the second end towards the first end. That is to say, the first and second textile members may be configured so that: each of the textile zones of the first and second textile members has a continuously variable stretch property in the orientation extending between the joined first ends and the joined second ends; or each of the textile zones of the first and second textile members has a discontinuously variable stretch property in the orientation extending between the joined first ends and the joined second ends; or one or more of the textile zones of the first and second textile members has a continuously variable stretch property in the orientation extending between the joined first ends and the joined second ends, while the or each other textile zone of the first and second textile members has a discontinuously variable stretch property in the orientation extending between the joined first ends and the joined second ends.

In further embodiments of the invention, the textile zone of at least one of the textile members may include a plurality of textile sub-zones arranged successively in the orientation extending between the joined first ends and the joined second ends, each textile sub-zone may have a respective constant or substantially constant stretch property, and the stretch properties of the textile sub-zones of the at least one textile member may be different from each other. In such embodiments, the textile zone of each textile member may include first and second textile sub-zones arranged successively in the orientation extending between the joined first ends and the joined second ends, and the first and second textile sub-zones of each textile member may be positioned towards the first and second ends respectively.

The stretch properties of the first and second textile sub-zones of the or each first textile member may be selected so that the first and second textile sub-zones of the or each first textile member respectively exhibit non-stretchability and stretchability. The stretch properties of the first and second textile sub-zones of the or each second textile member may be selected so that the first and second textile sub-zones of the or each second textile member respectively exhibit stretchability and non-stretchability.

A material exhibiting stretchability is a material that is capable of extending when subjected to an applied load, force or stress and then reverting to its original shape and size upon release of the applied load, force or stress. A stretchable material tends to have a high stretch property. A material exhibiting non-stretchability is a material that is incapable of extending when subjected to an applied load, force or stress and then reverting to its original shape and size upon release of the applied load, force or stress. A non-stretchable material tends to have a low stretch property.

By configuring the stretch properties of the first and second textile sub-zones of the first and second textile members in the foregoing manner, application of a load, force or stress to cause overall stretching of the stretchable textile article causes a reduction in distance, or an increase in overlap, between the stretchable textile sub-zones as a result of the non-deformation, or minimal deformation, of the non-stretchable textile sub-zones. Such reduction in distance, or increase in overlap, between the stretchable textile sub-zones can be used to provide the desired compression of the compressible textile member that interconnects the first and second textile members.

The textile sub-zones of the first and second textile members may be arranged so that, when the stretchable textile article is in an unstretched state:

the first textile sub-zone of the or each first textile member overlaps with the second textile sub-zone of the or each second textile member; or the first textile sub-zone of the or each second textile member overlaps with the second textile sub-zone of the or each first textile member; or the first textile sub-zone of the or each first textile member does not overlap with the second textile sub-zone of the or each second textile member, and the first textile sub-zone of the or each second textile member does not overlap with the second textile sub-zone of the or each first textile member.

When the stretchable textile article is in an unstretched state, it means that there is no net load, force or stress applied to the stretchable textile article which results in the stretchable textile article extending beyond its original shape and size. When the stretchable textile article is in a stretched state, it means that the stretchable textile article extends beyond its original shape and size in one or more dimensional orientations as a result of the application of a net load, force or stress in the or each such dimensional orientation.

In still further embodiments of the invention, the plurality of textile members may include a plurality of first textile members and/or a plurality of second textile members. The number of first textile members and the number of second textile members depend on the requirements of the associated textile product and/or application. Also, in such embodiments, the first and second textile members may be arranged in different ways to vary the overall stretch properties of the stretchable textile article. For example, the first and second textile members may be arranged to form alternately positioned first and second textile members.

In embodiments of the invention, the compressible textile member may include a tubular sleeve portion, the tubular sleeve portion including a bore arranged to receive the textile members. In such embodiments, the tubular sleeve portion may be braided.

The shape of the tubular sleeve portion is suitable for compression. In addition, the braided construction of the tubular sleeve portion is also suitable for compression.

The tubular sleeve portion of the compressible textile member can be designed to provide a user with comfort, improve the aesthetics of the stretchable textile article, and/or protect the textile members from damage.

The shape of each textile member may vary depending on the requirements of the stretchable textile article, such as functionality and aesthetics. For example, each textile member may be in the shape of a strip.

The stretchable textile article may be configured as a structural support component. Alternatively, the stretchable textile article may be configured for forming part of a structural support component. For example, the structural support component may be a strap or a band, which may be for a garment, an undergarment, a bag, a seat belt, and footwear.

In particular, when the stretchable textile article is additionally provided with the property of auxeticity as detailed above, the expansion of the compressible textile member provides additional structural support to a user wearing the stretchable textile article, since the expansion of the compressible textile member has the effect of providing a wider support area for a user. The wider support area can be designed to reduce a pressure on the user due to a load, force or stress applied to stretch the stretchable textile article. For example, the wider support area produced by the auxeticity of the stretchable textile article can be used for impact protection.

The stretchable textile article may be used in a wide range of textile products, preferably garments and technical textiles. A garment is a textile product worn on a wearer's body. A technical textile is a textile product manufactured primarily for functional purposes, and may or may not have aesthetic purposes. Examples of technical textiles include, but are not limited to, industrial textiles, medical textiles, protective textiles, electronics textiles, and so on.

It will be appreciated that the use of the terms "first" and "second", and the like, in this patent specification is merely intended to help distinguish between similar features (e.g. the first and second textile members, the first and second textile sub-zones, etc.), and is not intended to indicate the relative importance of one feature over another feature, unless otherwise specified.

Preferred embodiments of the invention will now be described, by way of non-limiting examples, with reference to the accompanying drawings in which.

Figure 11A:
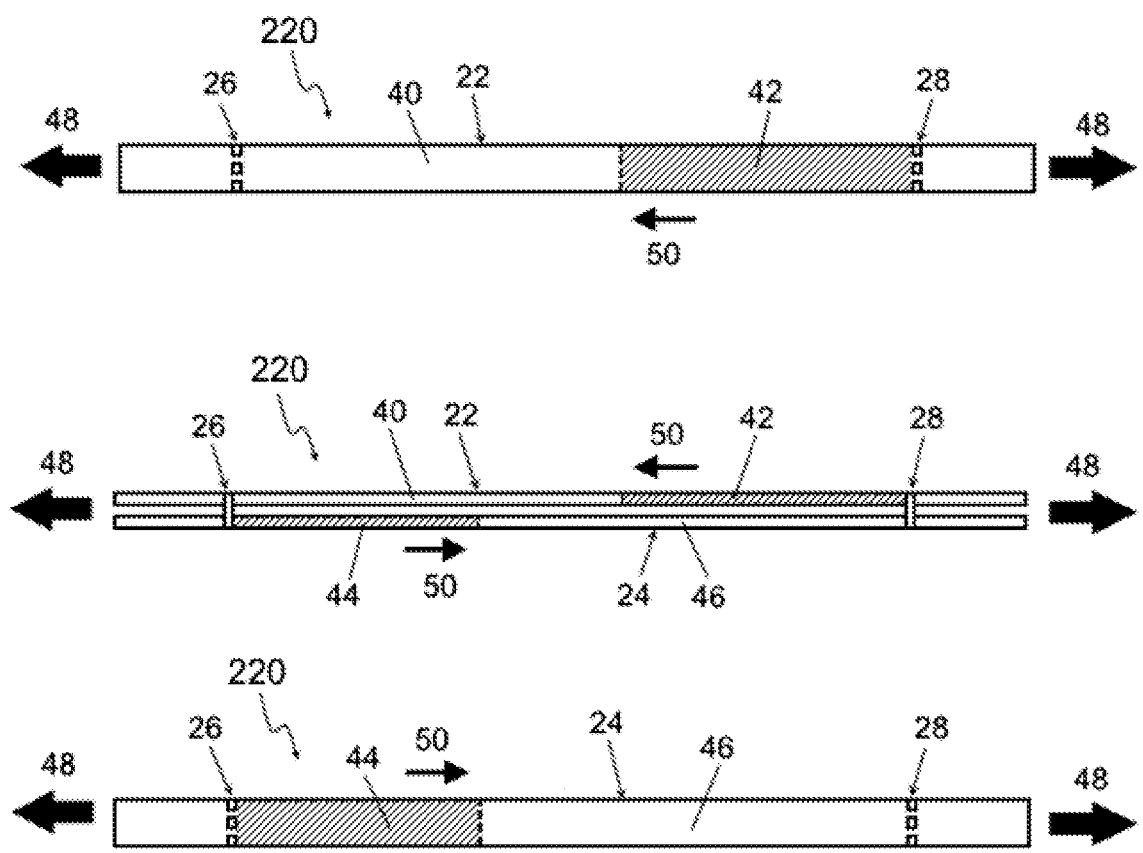
Figure 11B:
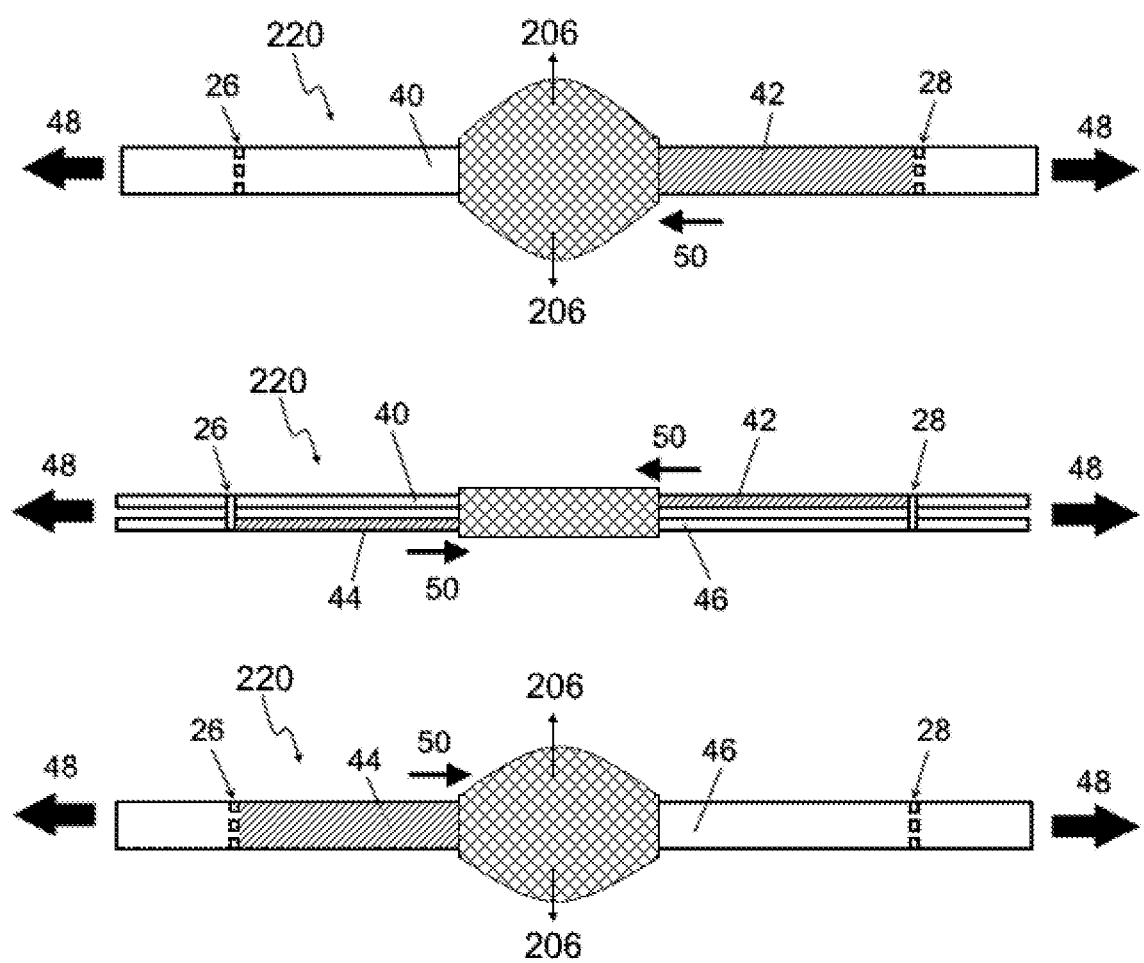
Figure 12:
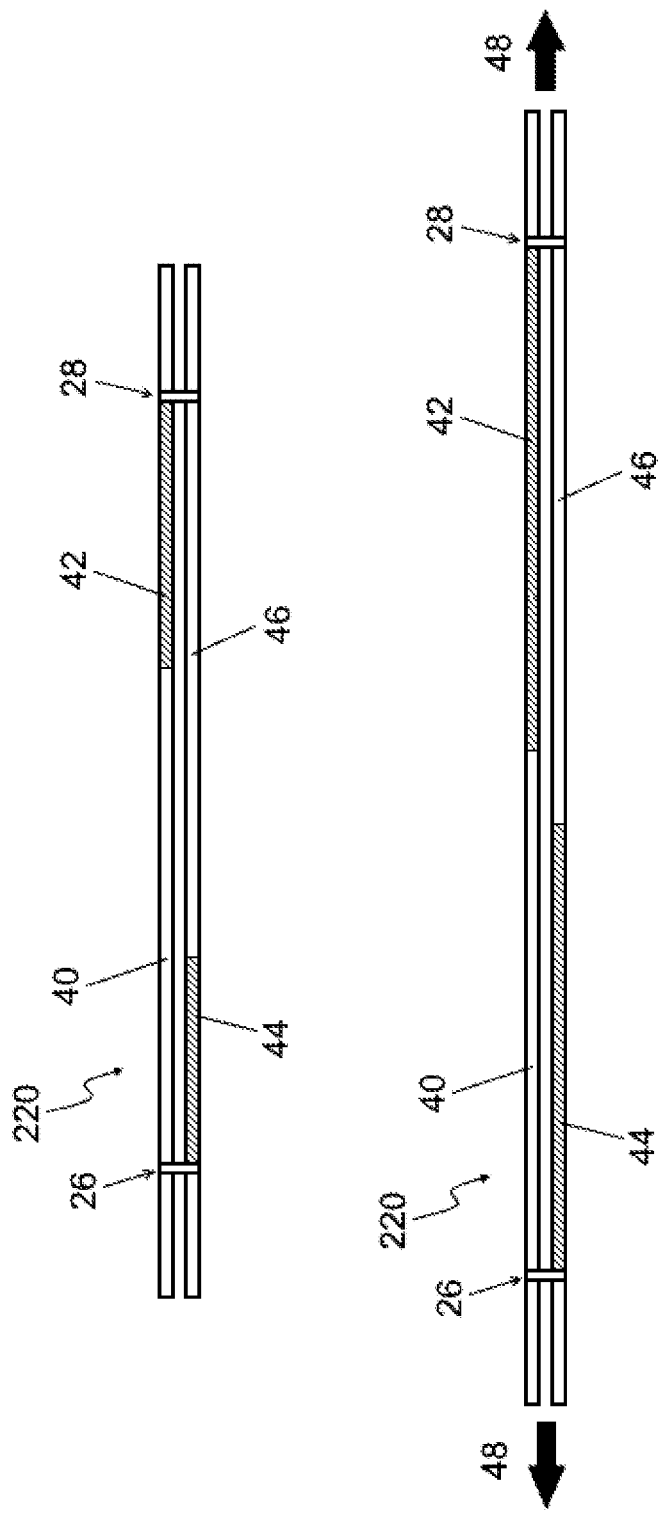

FIGS. 11a and 11b show relative stretch between textile members of the stretchable textile article of FIGS. 9a, 9b, 9c, 9d, 9e and 9f when a tensile load is applied to the stretchable textile article; and FIG. 12 shows a side-by-side comparison of the unstretched and stretched states of the stretchable textile article of FIGS. 9a, 9b, 9c, 9d, 9e and 9f.

The figures are not necessarily to scale, and certain features and certain views of the figures may be shown exaggerated in scale or in schematic form in the interests of clarity and conciseness.

The following embodiments of the invention are described with reference to stretchable textile articles made of woven textiles, but it will be appreciated that the working principle of each of the following embodiments of the invention is applicable mutatis mutandis to stretchable textile articles made of non-woven textiles.

Figure 1A:
FIGS. 1a and 1b show a stretchable textile article according to a first embodiment of the invention.
Figure 1B:
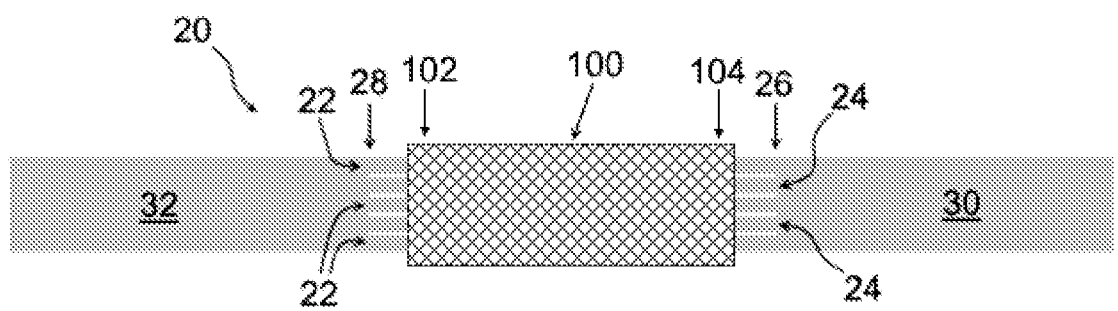

A stretchable textile article according to a first embodiment of the invention is shown in FIGS. 1a and 1b, and is designated generally by the reference numeral 20.

The stretchable textile article 20 comprises a plurality of discrete textile members 22,24. Each textile member 22,24 is in the form of a textile strip extending between a first end 26 and a second end 28. The first ends 26 of the plurality of textile members 22,24 are joined together via a first textile section 30, and the second ends 28 of the plurality of textile members 22,24 are joined together via a second textile section 32. The plurality of textile members 22,24 extends parallelly, or substantially parallelly, between the joined first ends 26 and the joined second ends 28, such that the plurality of textile members 22,24 flank each other between the joined first ends 26 and the joined second ends 28. Each textile member 22,24 is spaced apart from each neighbouring textile member 22,24 between the joined first ends 26 and the joined second ends 28.

Preferably the first and second textile sections 30,32 are non-stretchable, or rigid, textile sections. That is to say, the stretch properties of the first and second textile sections 30,32 are selected so that the first and second textile sections 30,32 exhibit non-stretchability.

The plurality of textile members 22,24 includes a plurality of first textile members 22 and a plurality of second textile members 24. The first and second textile members 22,24 are arranged to form alternately positioned first and second textile members 22,24 between the joined first ends 26 and the joined second ends 28.

Figure 2:
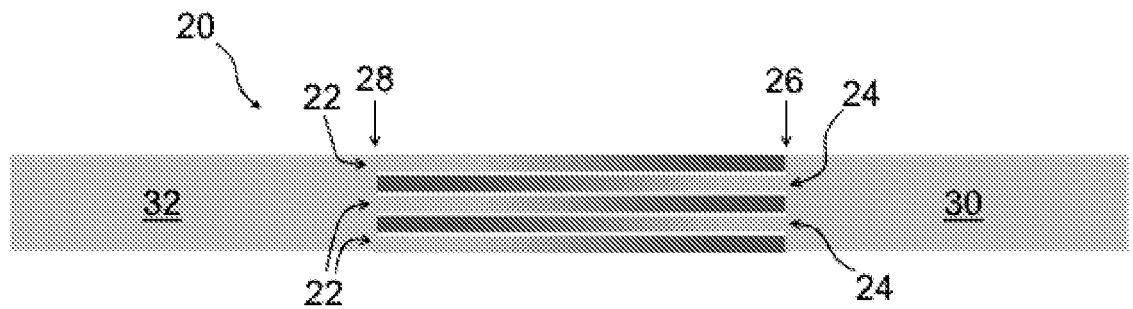
FIG. 2 shows a variation of the stretch property along a length of each textile member of the stretchable textile article of FIGS. 1a and 1b.

Each textile member 22,24 is made from an elastic woven textile material, and includes a textile zone extending fully along the length of the textile member 22,24. Each textile zone is configured to have an increasing stretch property in an orientation extending between the joined first ends 26 and the joined second ends 28. More specifically, the textile zone of each first textile member 22 has a continuously increasing stretch property along the length of the textile strip away from the first end 26 towards the second end 28, and the textile zone of each second textile member 24 has a continuously increasing stretch property along the length of the textile strip away from the second end 28 towards the first end 26. FIG. 2 shows the variation of the stretch property along the length of each textile member 22,24.

The increasing stretch property of the textile zone of each textile member 22,24 may be obtained by varying the textile characteristics of each textile member 22,24. This may include, for example, varying the weave construction (a tighter weave results in a lower stretch property, and a looser weave results in a higher stretch property), or changing the yarn density.

The stretchable textile article 20 further includes a compressible textile member 100, which is made from a braided textile material. The compressible textile member 100 includes a tubular sleeve portion having a bore in which the first and second textile members 22,24 are received. In other words, the compressible textile member 100 wraps around the first and second textile members 22,24. A first end 102 of the compressible textile member 100 is attached to the portions of the first textile members 22 towards the second ends 28, while a second end 104 of the compressible textile member 100 is attached to the portions of the second textile members 24 towards the first ends 26. The first end 102 of the compressible textile member 100 is not attached to the portions of the second textile members 24 towards the second ends 28, while the second end 104 of the compressible textile member 100 is not attached to the portions of the first textile members 22 towards the first ends 26.

Figure 3A:
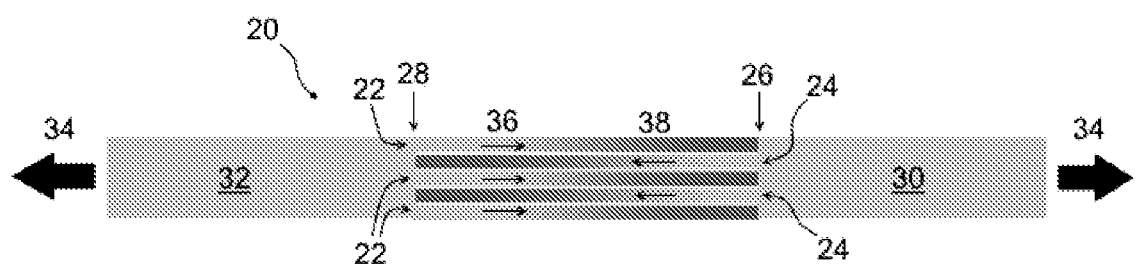
FIGS. 3a and 3b show relative stretch between textile members of the stretchable textile article of FIGS. 1a and 1b when a tensile load is applied to the stretchable textile article.

The stretchable textile article 20 can be stretched by applying a tensile load 34 to the joined first ends 26 and the joined second ends 28. Since the respective stretch properties of the textile zones of the first and second textile members 22,24 increase continuously in opposite directions between the first and second ends 26,28, the application of the tensile load 34 results in relative stretch between the first and second textile members in opposite directions. This causes the portion of each first textile member 22 positioned towards the second end 28 to stretch 36 towards the portion of each second textile member 24 positioned towards the first end 26, and causes the portion of each second textile member 24 positioned towards the first end 26 to stretch 38 towards the portion of each first textile member 22 positioned towards the second end 28, as shown in FIG. 3a. As a result, the distance between the two portions is reduced.

Figure 3B:
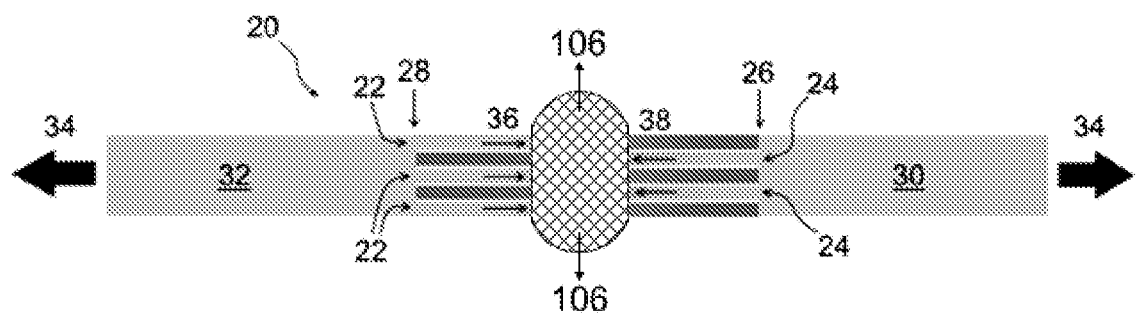

In turn, as shown in FIG. 3b, the above reduction in distance between the two portions brings the two ends 102,104 of the compressible textile member 100 together, thus causing compression of the compressible textile member 100. Due to the braided construction of the compressible textile member 100, the compression of the compressible textile member 100 causes expansion 106 of the compressible textile member 100 in an orientation that is perpendicular, or substantially perpendicular, to the orientation extending between the joined first ends 26 and the joined second ends 28. In this way the stretchable textile article 20 is provided with the property of auxeticity.

Figure 4:
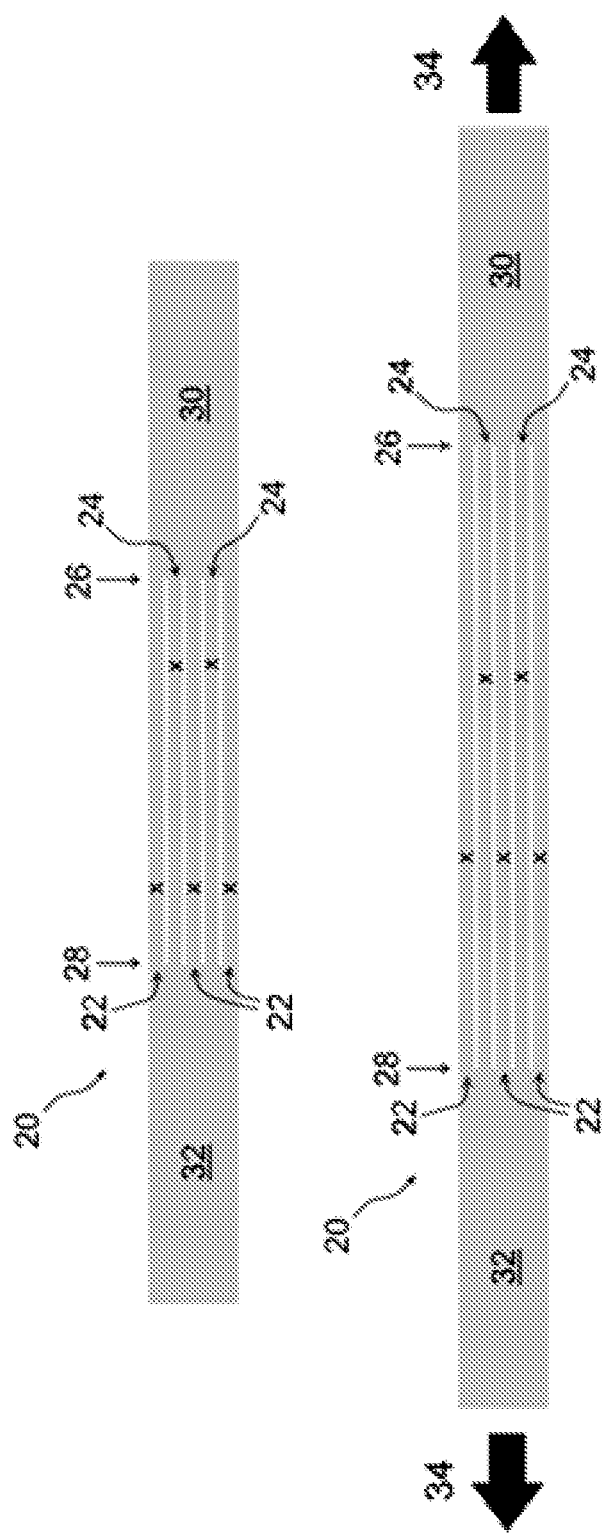
FIG. 4 shows a side-by-side comparison of the unstretched and stretched states of the stretchable textile article of FIG. 1.

FIG. 4 shows a side-by-side comparison of the unstretched and stretched states of the stretchable textile article 20. 'X' markers are used to illustrate the stretch behaviour of the first and second textile members 22,24, and therefore the relative stretch between the first and second textile members 22,24.

The combination of the plurality of discrete textile members 22,24 joined at the first and second ends 26,28 and the inclusion of a textile zone having an increasing stretch property in each textile member 22,24 therefore provides a multi-modulus stretchable textile article 20. The increasing stretch property, shape and size of each discrete textile member 22,24 can be varied to customise the stretch properties of the stretchable textile article 20 to match the requirements of a wide range of textile products and applications.

As a result of the structure of the stretchable textile article 20, it is more effective to stretch the stretchable textile article 20 by gradually applying the tensile load as opposed to suddenly applying the tensile load, e.g. by using a snapping pulling motion.

It is envisaged that, in other embodiments of the invention, the first and second textile members may be arranged between the first and second ends in other ways instead of alternately positioning the first and second textile members 22,24 between the first and second ends 26,28. For example, the textile members may be arranged so that the first textile members are grouped together at one side of the stretchable textile article, and the second textile members are grouped together at the other side of the stretchable textile article.

It is also envisaged that, in still other embodiments of the invention, the stretchable textile article 20 of FIGS. 1a and 1b may include a single first textile member instead of a plurality of first textile members 22, and/or a single second textile member instead of a plurality of second textile members 24.

It is further envisaged that, in further other embodiments of the invention, other than braiding, the compressible textile member 100 may be constructed in a different way so that, in use, the stretch of the stretchable textile article 120 in the orientation extending between the joined first ends 26 and the joined second ends 28 to compress the compressible textile member 100 causes expansion of the compressible textile member 100 in an orientation that is perpendicular, or substantially perpendicular, to the orientation extending between the joined first ends 26 and the joined second ends 28.

Figure 5:
FIG. 5 shows a stretchable textile article according to a second embodiment of the invention.

A stretchable textile article according to a second embodiment of the invention is shown in FIG. 5 and is designated generally by the reference numeral 120. The stretchable textile article 120 of FIG. 5 is similar in construction to the stretchable textile article 20 of FIG. 1, and like features share the same reference numerals.

The stretchable textile article 120 of FIG. 5 differs from the stretchable textile article 20 of FIG. 1 in that, in the stretchable textile article 120 of FIG. 5, the textile zone of the first textile member 22 has a discontinuously increasing stretch property along the length of the textile strip away from the first end 26 towards the second end 28, and the textile zone of the second textile member 24 has a discontinuously increasing stretch property along the length of the textile strip away from the second end 28 towards the first end 26.

Figure 6:
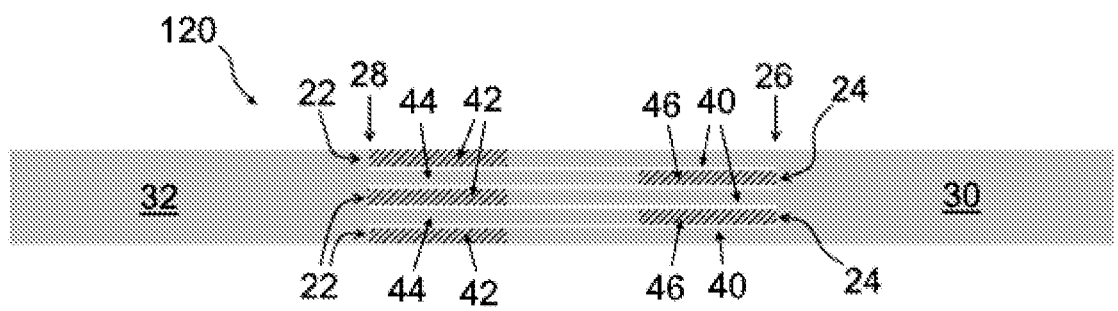
FIG. 6 shows a variation of the stretch property along a length of each textile member of the stretchable textile article of FIG. 5.

More specifically, as shown in FIG. 6, the textile zone of each textile member 22,24 includes first and second textile sub-zones 40,42,44,46 arranged successively along the length of the textile member 22,24 between the first and second ends 26,28. The first and second textile sub-zones 40,42,44,46 of each textile member 22,24 are positioned towards the first and second ends 26,28 respectively.

The textile sub-zone 40 of each first textile member 22 adjacent the first end 26 has a respective constant or substantially constant stretch property, and the textile sub-zone 42 of each first textile member 22 adjacent the second end 28 has a continuously increasing stretch property along the length of the textile sub-zone 42 away from the first end 26 towards the second end 28. The textile sub-zone 44 of each second textile member 24 adjacent the first end 28 has a respective constant or substantially constant stretch property, and the textile sub-zone 46 of each second textile member 24 adjacent the second end 28 has a continuously increasing stretch property along the length of the textile sub-zone 46 away from the second end 28 towards the first end 26.

The stretch properties of the first and second textile sub-zones 40,42 of each first textile member 22 are selected so that the first and second textile sub-zones 40,42 of each first textile member 22 respectively exhibit non-stretchability and stretchability. The stretch properties of the first and second textile sub-zones 44,46 of each second textile member 24 are selected so that the first and second textile sub-zones 44,46 of each second textile member 24 respectively exhibit stretchability and non-stretchability.

In the embodiment shown, the textile sub-zones 40,42, 44,46 of the first and second textile members 22,24 are arranged so that, when the stretchable textile article 120 is in an unstretched state, the non-stretchable first textile sub-zone 40 of each first textile member 22 overlaps with the non-stretchable second textile sub-zone 46 of each second textile member 24.

Figure 7A:
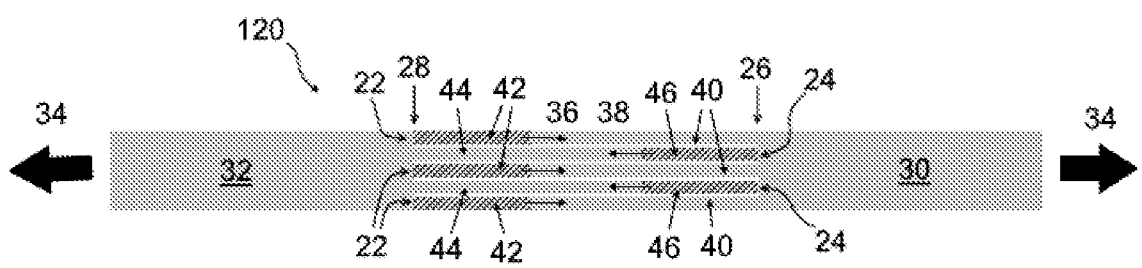
FIGS. 7a and 7b show relative stretch between textile members of the stretchable textile article of FIG. 5 when a tensile load is applied to the stretchable textile article.

In a similar fashion to the embodiment of FIG. 1, applying a tensile load 34 to the joined first ends 26 and the joined second ends 28 results in relative stretch 36,38 between the first and second textile members 22,24 in opposite directions, as shown in FIG. 7a. This results in a reduction in overlap between the non-stretchable textile sub-zones 40,46 and therefore a reduction in distance between the stretchable textile sub-zones 42,44 as a result of the non-deformation, or minimal deformation, of the non-stretchable textile sub-zones 40,46, as shown in FIG. 7a. In the event of the application of a sufficiently large tensile load 34, an overlap between the stretchable textile sub-zones 42,44 can be obtained.

Figure 7B:
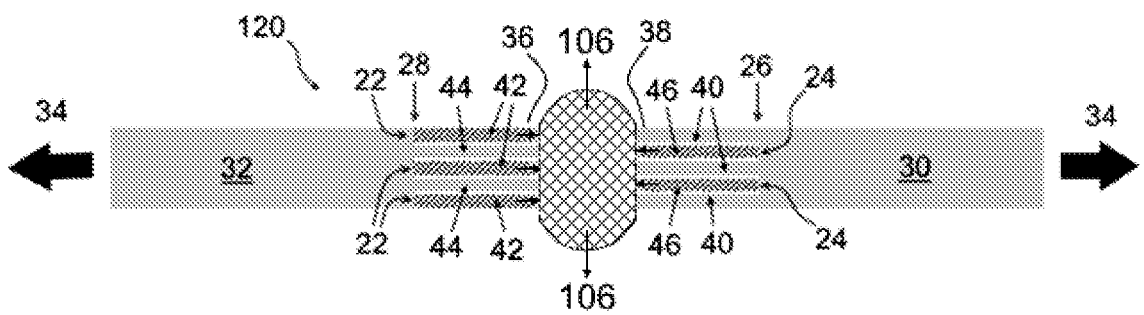

In turn, as shown in FIG. 7b, the above reduction in distance between the two portions brings the two ends 102,104 of the compressible textile member 100 together, thus causing compression of the compressible textile member 100. Due to the braided construction of the compressible textile member 100, the compression of the compressible textile member 100 causes expansion 106 of the compressible textile member 100 in an orientation that is perpendicular, or substantially perpendicular, to the orientation extending between the joined first ends 26 and the joined second ends 28. In this way the stretchable textile article 20 is provided with the property of auxeticity.

Figure 8:
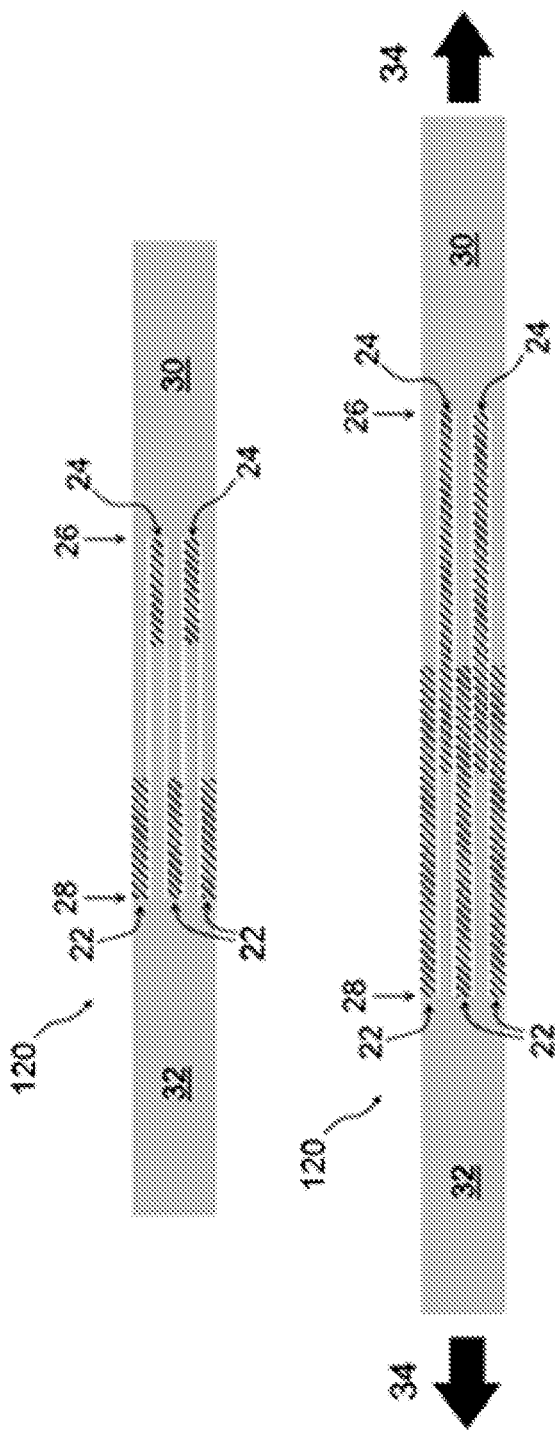
FIG. 8 shows a side-by-side comparison of the unstretched and stretched states of the stretchable textile article of FIG. 5.

FIG. 8 shows a side-by-side comparison of the unstretched and stretched states of the stretchable textile article 120.

A stretchable textile article according to a third embodiment of the invention is shown in FIGS. 9a to 9f and is designated generally by the reference numeral 220. The stretchable textile article 220 of 9a to 9f is similar in construction to the stretchable textile article 20 of FIGS. 1a and 1b, and like features share the same reference numerals.

The stretchable textile article 220 of FIGS. 9a to 9f differs from the stretchable textile article 20 of FIGS. 1a and 1b in that, in the stretchable textile article 220 of FIGS. 9a to 9f:
  the plurality of textile members 22,24 includes a single first textile member 22 and a single second textile member 24;
  the textile members 22,24 are arranged to extend parallelly, or substantially parallelly, between the joined first ends 26 and the joined second ends 28, and overlie each other between the joined first ends 26 and the joined second ends 28; and
  the first ends 26 of the first and second textile members 22,24 are stitched together, and the second ends 28 of the first and second textile members 22,24 are stitched together.

Figure 9A:
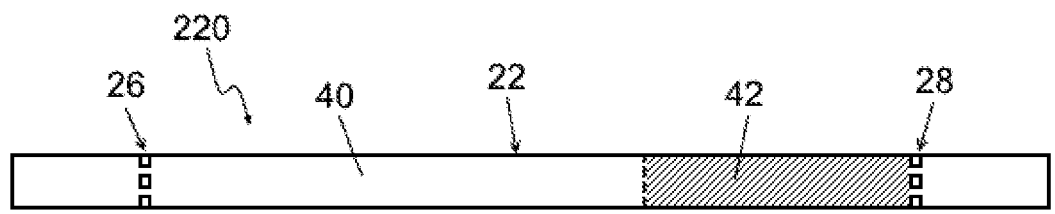
FIGS. 9a, 9b, 9c, 9d, 9e and 9f show a stretchable textile article according to a third embodiment of the invention.
Figure 9B:
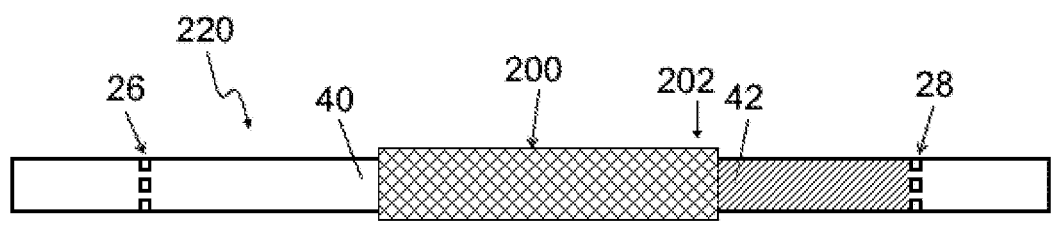
Figure 9C:
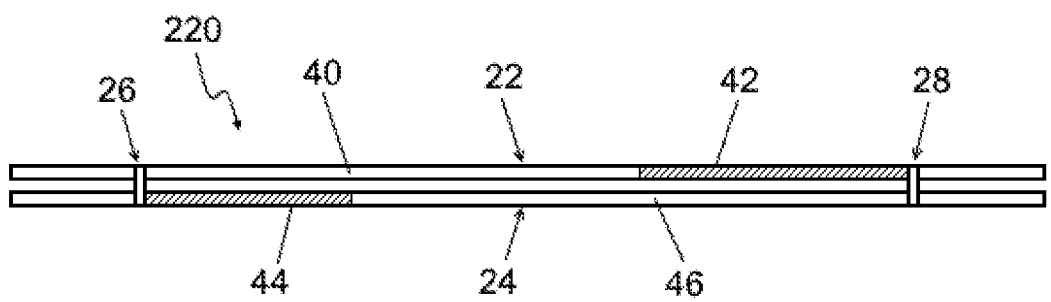
Figure 9D:
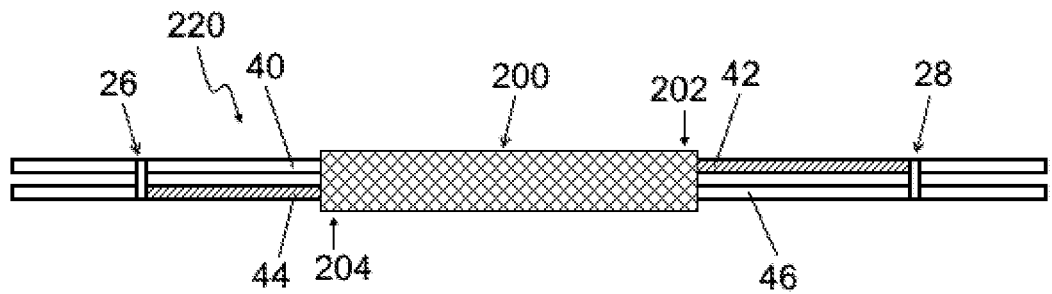
Figure 9E:
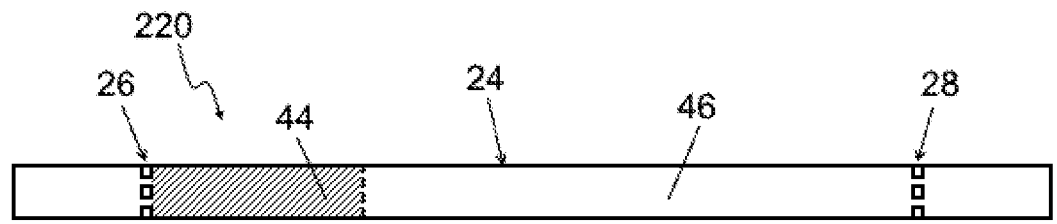
Figure 9F:
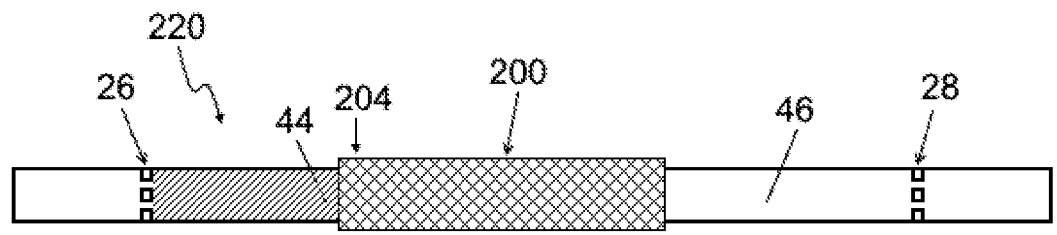

FIGS. 9a and 9b are top views of the stretchable textile article 220, which respectively show the first textile member 22 with and without the compressible textile member 200. FIGS. 9c and 9d are side views of the stretchable textile article 220, which respectively show both the first and second textile members 22,24 with and without the compressible textile member 200. FIGS. 9e and 9f are bottom views of the stretchable textile article 220, which respectively show the second textile member 24 with and without the compressible textile member 200.

The textile zone of the first textile member 22 has a discontinuously increasing stretch property along the length of the textile strip away from the first end 26 towards the second end 28, and the textile zone of the second textile member 24 has a discontinuously increasing stretch property along the length of the textile strip away from the second end 28 towards the first end 26.

Figure 10:
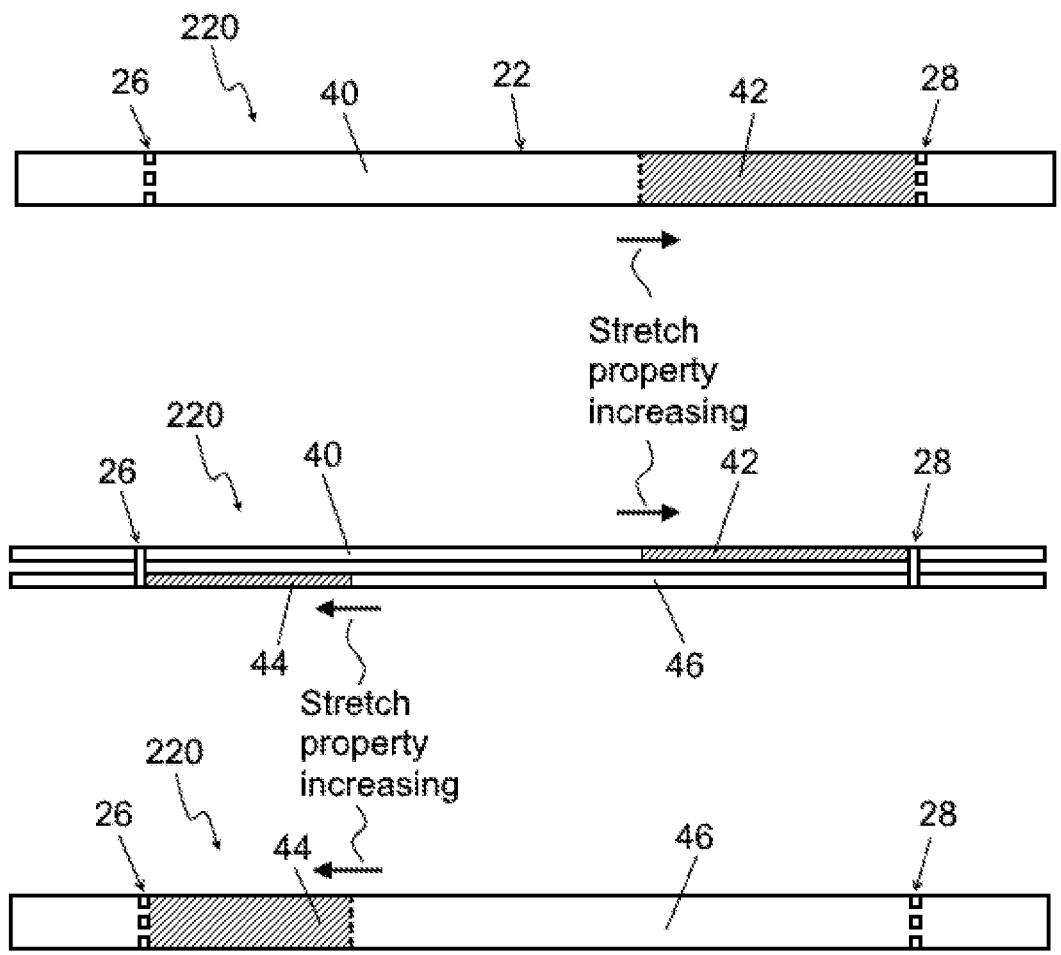
FIG. 10 shows a variation of the stretch property along a length of each textile member of the stretchable textile article of FIGS. 9a, 9b, 9c, 9d, 9e and 9f.

More specifically, as shown in FIG. 10, the textile zone of each textile member 22,24 includes first and second textile sub-zones 40,42,44,46 arranged successively along the length of the textile member 22,24 between the first and second ends 26,28. The first and second textile sub-zones 40,42,44,46 of each textile member 22,24 are positioned towards the first and second ends 26,28 respectively. Each textile sub-zone 40,42,44,46 has a respective constant or substantially constant stretch property. The stretch properties of the first and second textile sub-zones 40,42 of the first textile member 22 are selected so that the first and second textile sub-zones 40,42 of the first textile member 22 respectively exhibit non-stretchability and stretchability. The stretch properties of the first and second textile sub-zones 44,46 of the second textile member 24 are selected so that the first and second textile sub-zones 44,46 of the second textile member 24 respectively exhibit stretchability and non-stretchability.

In the embodiment shown, the textile sub-zones 40,42, 44,46 of the first and second textile members 22,24 are arranged so that, when the stretchable textile article 220 is in an unstretched state, the non-stretchable first textile sub-zone 40 of the first textile member 22 overlaps with the non-stretchable second textile sub-zone 46 of the second textile member 24.

The compressible textile member 200 is made from a braided textile material, and includes a tubular sleeve portion having a bore in which the first and second textile members 22,24 are received. In other words, the compressible textile member 200 wraps around the first and second textile members 22,24. A first end 202 of the compressible textile member 202 is attached to the stretchable textile sub-zone 42 of the first textile member 22, while a second end 204 of the compressible textile member 200 is attached to the stretchable textile sub-zone 44 of the second textile member 24. The second end 204 of the compressible textile member 200 is not attached to the non-stretchable textile sub-zone 40 of the first textile member 22, while the first end 202 of the compressible textile member 200 is not attached to the non-stretchable textile sub-zone 46 of the second textile member 24.

In a similar fashion to the embodiment of FIGS. 1a and 1b, applying a tensile load 48 to the joined first ends 26 and the joined second ends 28 results in relative stretch 50 between the first and second textile members 22,24 in opposite directions. This results in a reduction in overlap between the non-stretchable textile sub-zones 40,46 and therefore a reduction in distance between the stretchable textile sub-zones 42,44 as a result of the non-deformation, or minimal deformation, of the non-stretchable textile sub-zones 40,46, as shown in FIG. 11a.

In turn, as shown in FIG. 11b, the above reduction in distance between the stretchable textile sub-zones 42,44 brings the two ends 202,204 of the compressible textile member 200 together, thus causing compression of the compressible textile member 200. Due to the braided construction of the compressible textile member 200, the compression of the compressible textile member 200 causes expansion 206 of the compressible textile member 200 in an orientation that is perpendicular, or substantially perpendicular, to the orientation extending between the joined first ends 26 and the joined second ends 28. In this way the stretchable textile article 220 is provided with the property of auxeticity.

FIG. 12 shows a side-by-side comparison of the unstretched and stretched states of the stretchable textile article 220.

It is envisaged that, in other embodiments of the invention, the stretchable textile article 220 of FIGS. 9a to 9f may include a plurality of first textile members instead of a single first textile member 22, and/or a plurality of second textile members instead of a single second textile member 24.

It is also envisaged that, in still other embodiments of the invention, the textile sub-zones 40,42,44,46 of the first and second textile members 22,24 are arranged so that, when the stretchable textile article 220 is in an unstretched state:

the stretchable first textile sub-zone 44 of the second textile member 24 overlaps with the stretchable second textile sub-zone 42 of the first textile member 22; or the non-stretchable first textile sub-zone 40 of the first textile member 22 overlaps with the stretchable first textile sub-zone 44 of the second textile member 24 but does not overlap with the non-stretchable second textile sub-zone 46 of the second textile member 24, while the stretchable second textile sub-zone 42 of the first textile member 22 overlaps with the non-stretchable second textile sub-zone 46 of the second textile member 24 but does not overlap with the stretchable first textile sub-zone 44 of the second textile member 24.

Each of the embodiments 20,120,220 of FIGS. 1a and 1b, FIG. 5 and FIGS. 9a to 9f may be used as a structural support component for a garment.

In one example, the embodiment 20,120,220 of FIGS. 1a and 1b, FIG. 5 or FIGS. 9a to 9f is configured as a strap for a brassiere. After the brassiere is worn resulting in a stretched strap, the expansion 106,206 of the compressible textile member 100,200 results in the provision of a wider support area for a user wearing the brassiere, thus reducing pressure applied to the user's shoulders.

Each of the embodiments 20,120,220 of FIGS. 1a and 1b, FIG. 5 and FIGS. 9a to 9f may be configured as a different type of structural support component, other than a strap or a band. Each of the embodiments 20,120,220 of FIGS. 1a and 1b, FIG. 5 and FIGS. 9a to 9f may be used in another type of garment, a bag, a seat belt, footwear, or a technical textile.

It will be appreciated that, in embodiments of the invention, the textile zone of each textile member may be divided into any number of a plurality of textile sub-zones having different stretch properties.

It will also be appreciated that shading and/or hatching is used in the figures for clarity of illustration of the different features of the embodiments.

The invention claimed is:

1. A stretchable textile article comprising a plurality of discrete textile members, each textile member extending between a first end and a second end, the first ends of the textile members being joined together, the second ends of the textile members being joined together, wherein the plurality of textile members includes at least one first textile member and at least one second textile member, the at least one first textile member including a textile zone configured to have an increasing stretch property away from the first end towards the second end, the at least one second textile member including a textile zone configured to have an increasing stretch property away from the second end towards the first end, wherein the stretchable textile article further includes a compressible textile member arranged to interconnect the first and second textile members so that, in use, stretch of the stretchable textile article in an orientation extending between the joined first ends and the joined second ends causes compression of the compressible textile member, wherein the compressible textile member includes a braided tubular sleeve portion, the tubular sleeve portion including a bore arranged to receive the first and second textile members.

2. The stretchable textile article of claim 1 wherein the compressible textile member is configured so that, in use, the stretch of the stretchable textile article in the orientation extending between the joined first ends and the joined second ends to compress the compressible textile member causes expansion of the compressible textile member in an orientation that is perpendicular, or substantially perpendicular, to the orientation extending between the joined first ends and the joined second ends.

3. The stretchable textile article of claim 1 wherein the first and second textile members are arranged to:
   extend parallelly, or substantially parallelly, between the joined first ends and the joined second ends; and/or
   flank each other between the joined first ends and the joined second ends; and/or
   overlie each other between the joined first ends and the joined second ends.

4. The stretchable textile article of claim 1 wherein the stretch property of the textile zone of the at least one first textile member is continuously or discontinuously increasing away from the first end towards the second end, and the stretch property of the textile zone of the at least one second textile member is continuously or discontinuously increasing away from the second end towards the first end.

5. The stretchable textile article of claim 1 wherein the textile zone of at least one of the first and second textile members includes a plurality of textile sub-zones arranged successively in the orientation extending between the first and second ends, each textile sub-zone has a respective constant or substantially constant stretch property, and the stretch properties of the textile sub-zones of the at least one textile member are different from each other.

6. The stretchable textile article of claim 5 wherein the textile zone of each of the first and second textile members includes first and second textile sub-zones arranged successively in the orientation extending between the joined first ends and the joined second ends, and the first and second textile sub-zones of each textile member are positioned towards the first and second ends respectively.

7. The stretchable textile article of claim 6 wherein the stretch properties of the first and second textile sub-zones of the at least one first textile member are selected so that the first and second textile sub-zones of the at least one first textile member respectively exhibit non-stretchability and stretchability, and the stretch properties of the first and second textile sub-zones of the at least one second textile member are selected so that the first and second textile sub-zones of the at least one second textile member respectively exhibit stretchability and non-stretchability.

8. The stretchable textile article of claim 7 wherein the textile sub-zones of the first and second textile members are arranged so that, when the stretchable textile article is in an unstretched state:
   the first textile sub-zone of the at least one first textile member overlaps with the second textile sub-zone of the at least one second textile member; or
   the first textile sub-zone of the at least one second textile member overlaps with the second textile sub-zone of the at least one first textile member; or
   the first textile sub-zone of the at least one first textile member does not overlap with the second textile sub-zone of the at least one second textile member, and the first textile sub-zone of the at least one second textile member does not overlap with the second textile sub-zone of the at least one first textile member.

9. The stretchable textile article of claim 1 wherein the plurality of textile members includes a plurality of first textile members and/or a plurality of second textile members, wherein the first and second textile members are arranged to form alternately positioned first and second textile members.

10. The stretchable textile article of claim 1 wherein each of the first and second textile members is in the shape of a strip.

11. The stretchable textile article of claim 1 wherein the stretchable textile article is configured as a structural support component, or wherein the stretchable textile article is configured for forming part of a structural support component.

12. The stretchable textile article of claim 11 wherein the structural support component is a strap or a band.

13. A garment or a technical textile comprising the stretchable textile article of claim 1.

* * * * *